US008050587B2

(12) United States Patent
Kurihara

(10) Patent No.: US 8,050,587 B2
(45) Date of Patent: Nov. 1, 2011

(54) IMAGE FORMING APPARATUS WITH N-UP PRINT MODE GROUPING AND ALIGNMENT

(75) Inventor: Susumu Kurihara, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 474 days.

(21) Appl. No.: 12/267,627

(22) Filed: Nov. 10, 2008

(65) Prior Publication Data

US 2009/0129805 A1 May 21, 2009

(30) Foreign Application Priority Data

Nov. 16, 2007 (JP) ................................ 2007-297416

(51) Int. Cl.
*G06K 15/00* (2006.01)
*G03G 15/00* (2006.01)

(52) U.S. Cl. .......... 399/82; 399/204; 358/1.9; 358/1.18; 358/2.1

(58) Field of Classification Search .................. 399/204; 358/1.18
See application file for complete search history.

(56) References Cited

U.S. PATENT DOCUMENTS 6,295,385 B1 * 9/2001 Takaoka et al. ............... 382/289
7,308,155 B2 * 12/2007 Terada .......................... 382/284
7,349,638 B2 * 3/2008 Mima ............................ 399/24
7,808,663 B2 * 10/2010 Teranishi et al. ............ 358/1.15
2003/0184788 A1 * 10/2003 Watanabe et al. ............ 358/1.13
2004/0184106 A1 * 9/2004 Ferlitsch ........................ 358/2.1
2005/0038919 A1 * 2/2005 Matsubara et al. ............... 710/1
2005/0200912 A1 * 9/2005 Yamakado et al. ........... 358/450
2007/0229860 A1 * 10/2007 Matsubara et al. ............ 358/1.9
2007/0229883 A1 * 10/2007 Fujimori et al. ............. 358/1.15
2008/0079963 A1 * 4/2008 Matsubara ..................... 358/1.9
2009/0002732 A1 * 1/2009 Shirata ........................... 358/1.9

FOREIGN PATENT DOCUMENTS

JP 2003-101753 A 4/2003

* cited by examiner

*Primary Examiner* — David Gray
*Assistant Examiner* — David Bolduc
(74) *Attorney, Agent, or Firm* — Buchanan Ingersoll & Rooney PC

(57) ABSTRACT

There is described an image forming apparatus that performs an image forming operation in a N-up printing mode based on a print job. The apparatus includes an image forming section; an operating section to designate the N-up printing mode, and to set an arranging method in the N-up printing mode; and a controlling section to apply image processing to the image data of the plural pages, so that the plural images are arranged onto the single paper sheet according to the arranging method set by the operating section. When implementing the image forming operation in the N-up printing mode, the controlling section groups the plural pages into plural groups, each of which includes specific pages fulfilling a same condition in respect to the image forming operation, and then, aligns the specific pages on a same line among plural lines extended along a conveying direction of the paper sheet.

12 Claims, 9 Drawing Sheets

IMAGE FORMING APPARATUS WITH N-UP PRINT MODE GROUPING AND ALIGNMENT

This application is based on Japanese Patent Application NO. 2007-297416 filed on Nov. 16, 2007, with Japan Patent Office, the entire content of which is hereby incorporated by reference.

BACKGROUND OF THE INVENTION

The present invention relates an image forming apparatus that conducts image forming operations based on image data and is provided with a N-up printing mode in which a plurality of images represented by image data for a plurality of pages are printed by aligning them on a single paper sheet.

There has been well-known an image forming apparatus, such as a copier, a printer, a facsimile device, a Multifunctional Peripheral including abovementioned functions, etc., that conducts image-forming operations based on the image data, and is provided with the N-up printing mode which makes it possible not only to save a number of paper sheets to be consumed, but also to reduce the counting amount of printed paper sheets, by aligning a plurality of images represented by image data for a plurality of pages on a single paper sheet when conducting the image-forming operations. Although, sometimes, the N-up printing mode is called a N-in-1 mode, an Integration mode, etc., such the differently named modes have substantially the same function. It is applicable that the image data for a plurality of pages represent either a plurality of different images or a single image.

Tokkai 2003-101753 (Japanese Non-Examined Patent Publication) sets forth an image forming apparatus that is provided with an image integrating means to form an intensive image that includes a plurality of document images distributed on a single transfer material. According to the above image forming apparatus, the image integrating means reads a single document according to plural image processing methods established in advance, and makes it possible to put the image processing results together, so as to output the intensive image onto a single transfer material. The abovementioned feature makes it possible to eliminate cumbersome settings and operations to be conducted by the operator for repeating the copying operations by changing the image processing mode many times, etc., and to speedily confirm the contents of the image processing desired by the operator. Accordingly, it becomes possible not only to shorten the working hours and improve the maneuverability of the image forming apparatus, but also to reduce a number of unnecessary copies, resulting in an improvement of the economical aspects of the image forming apparatus.

In this connection, generally speaking in the N-up printing mode, it is possible to designate an arranging order of the images represented by the image data. For instance as shown in FIG. 10(*a*), FIG. 10(*b*), FIG. 10(*c*) and FIG. 10(*d*), various kinds of image arrangements, to be applied when four page images are arranged within a single paper sheet, will be detailed in the following. FIG. 10(*a*) shows a method for sequentially arranging the four page images in a vertical direction by setting the start position at the leading edge side relative to the conveying direction. FIG. 10(*b*) shows another method for sequentially arranging the four page images in a vertical direction by setting the start position at the trailing edge side relative to the conveying direction. FIG. 10(*c*) shows still another method for sequentially arranging the four page images in a horizontal direction by setting the start position at the leading edge side relative to the conveying direction. FIG. 10(*d*) shows yet another method for sequentially arranging the four page images in a horizontal direction by setting the start position at the trailing edge side relative to the conveying direction. It is possible for the user to designate any one of the abovementioned four kinds of image arrangements.

In the light-material printing market, sometimes, the abovementioned N-up printing mode is employed for reducing the printing cost, in such a manner that the same images for plural pages are printed on a single transfer paper, and then, the printed images are cut into the plural pages by employing an offline post processing apparatus. However, if there exists in the image forming section a density inclination along the main-scanning direction from the leading edge to the trailing edge of the single transfer paper concerned, the density of the images disposed at the leading edge side is different from that disposed at the trailing edge side. Since the same images are printed on the single transfer paper, the color and quality differences between the images can be considerably recognized and cause the deterioration of the printing quality. Further, even when the different images are printed, the color and quality differences between them, caused by the density inclination, are sensible for the user, resulting in the deterioration of the printing quality.

Generally speaking, in the image forming section, a toner image is formed on the photoreceptor drum according to the steps of: uniformly charging a circumferential surface of the photoreceptor drum by activating the charging section; conducting the exposure scanning operation to form a latent image by activating the image writing section; and applying the reversible developing operation to the latent image with toner, so as to form the toner image on the circumferential surface of the photoreceptor drum. Then, the image-forming operation is achieved by transferring the toner image onto the paper sheet. Accordingly, the cause of the density inclination mentioned in the above varies in a wide range of factors in the main-scanning direction, such as mechanical variations in the image writing section, a longitudinal inclination of the charging electrode relative to the circumferential surface of the photoreceptor drum, etc. Therefore, it has been a difficult problem how to cope with the density inclination when it happens.

SUMMARY OF THE INVENTION

To overcome the abovementioned drawbacks in conventional image forming apparatus, it is one of objects of the present invention to provide an image forming apparatus, which makes it possible to conduct such an image forming operation that avoids an output failure due to the difference between image densities so as to keeps the image density constant.

Accordingly, at least one of the objects of the present invention can be attained by the image forming apparatus described as follow.

According to an image forming apparatus reflecting an aspect of the present invention, the image forming apparatus that performs an image forming operation based on a job, and that is provided with a N-up printing mode in which plural images, represented by image data of plural pages, are arranged onto a single paper sheet, comprises: an image forming section that forms an image on a paper sheet, based on image data; an operating section to designate the N-up printing mode, and to set an arranging method, to be employed in the N-up printing mode, for arranging the plural images, represented by the image data of the plural pages, onto the single paper sheet; and a controlling section to apply image processing to the image data of the plural pages, so that the plural images, represented by the image data of the plural pages, are arranged onto the single paper sheet according to the arranging method set by the operating section, when the N-up printing mode is designated from the operating section; wherein, when implementing the image forming operation in the N-up printing mode, the controlling section groups the plural pages into a single group or plural groups, each of which includes specific pages fulfilling a same condition in respect to the image forming operation, and then, aligns the specific pages, included in the single group or one of the plural groups, on a same line among plural lines extended along a conveying direction of the single paper sheet.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
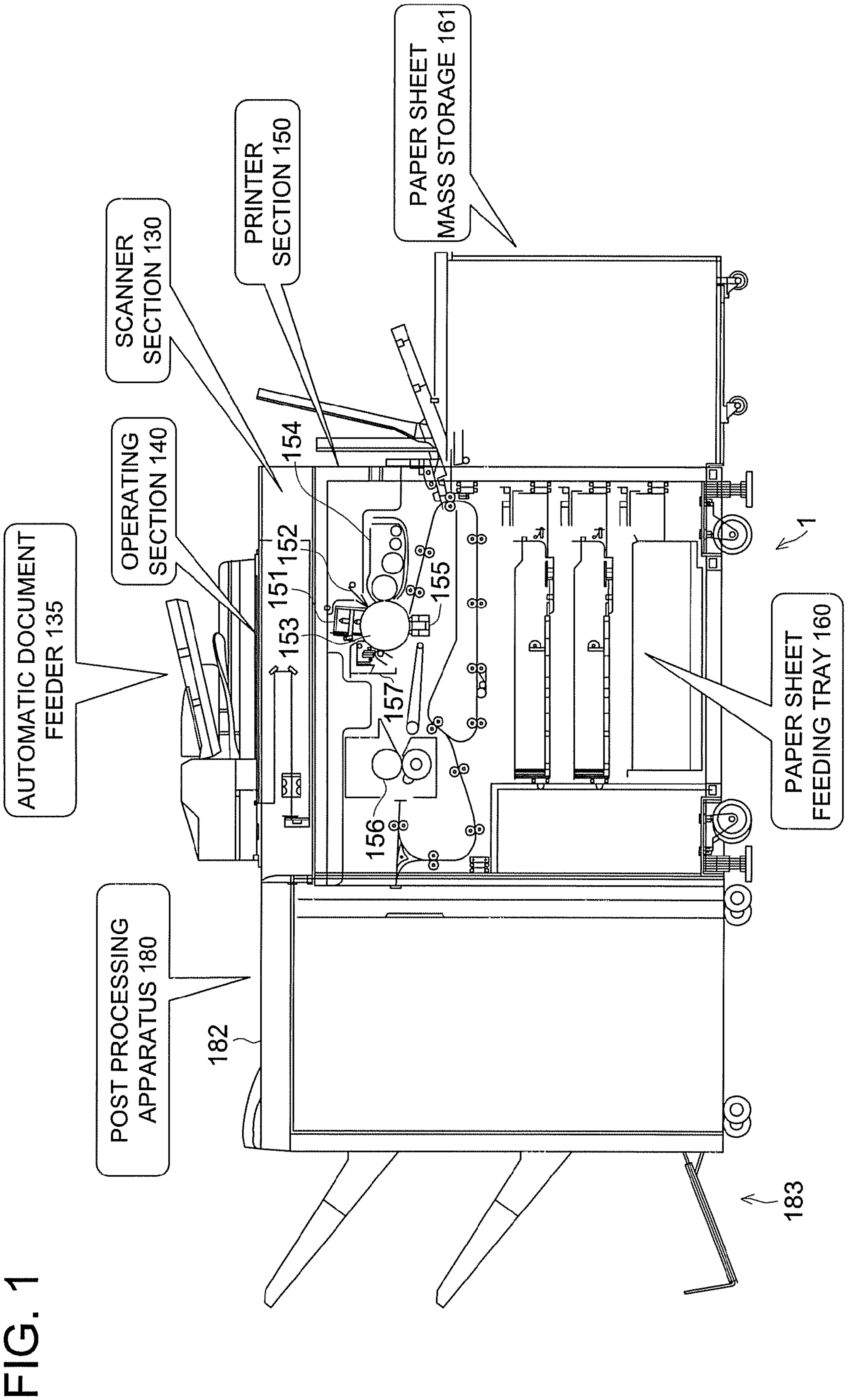
FIG. 1 shows an overall mechanical configuration of an image forming apparatus embodied in the present invention.

Next, referring to the drawings, an image forming apparatus embodied in the present invention will be detailed in the following. FIG. 1 shows a mechanical configuration of an image forming apparatus 1 embodied in the present invention. The image forming apparatus 1 is a Digital Multifunctional apparatus provided with functions of a printer, a scanner and a copier. A scanner section 130 and an automatic document feeder 135 are mounted on the upper section of the image forming apparatus 1. Further, an operating section 140, from which the operator can conduct various kinds of inputting operations and on which various kinds of information concerning to the image forming apparatus 1 can be displayed, is disposed in the vicinity of the scanner section 130 and the automatic document feeder 135. In addition, the operating section 140 makes it possible to conduct an inputting operation for any one of: a designation of the N-up printing mode in which the image forming operation is conducted in such a manner that a plurality of images represented by image data for a plurality of pages are arranged in a single paper sheet when conducting the image-forming operation; a designation of a normal printing mode in which an image is formed on a single paper sheet; and a setting of method for arranging the images, represented by the image data for the plurality of pages, in the N-up printing mode.

A paper sheet feeding tray 160, provided with a plurality of unit stages for accommodating various kinds of paper sheets so as to feed them to a printer section, is disposed in a lower section of the image forming apparatus 1. Further, a paper sheet mass storage 161 is coupled to an external side section of the image forming apparatus 1.

Further, a printer section 150 provided in the image forming apparatus 1 corresponds to the image forming section of the present invention, and is constituted by a charging section 151, an LD (Laser Diode) 152, a photoreceptor drum 153, a developing section 154, a transferring section 155, a fixing section 156, a cleaning section 157, etc. Still further, a post processing apparatus 180 is coupled to a downstream side of the printer section 150.

In the printer section 150, a toner image is formed on the photoreceptor drum 153 according to the steps of: uniformly charging a circumferential surface of the photoreceptor drum 153 by activating the charging section 151; conducting the exposure scanning operation to form a latent image by scanning the laser beam emitted from the LD 152, modulated on the basis of the image data acquired by reading the document, etc., in the scanner section 130; and applying a reversible developing operation to the latent image with toner by activating the developing section 154, so as to form the toner image on the circumferential surface of the photoreceptor drum 153.

The paper sheet fed from the paper sheet feeding tray 160 or the paper sheet mass storage 161 is conveyed to a transferring position, at which the toner image is transferred onto the paper sheet by activating the transferring section 155. Then, the paper sheet having the formed image is further conveyed to the fixing section 156 in which heat and pressure are applied to the paper sheet with the toner image, so as to fix the toner image onto it, and successively, further conveyed into the post processing apparatus 180. After the transferring operation is completed, the residual toner particles, remaining on the circumferential surface of the photoreceptor drum 153, are removed by the cleaning section 157, so as to prepare for the next image-forming operation.

The post processing apparatus 180, into which the paper sheet having the fixed image is conveyed, is provided with a stapling section, a punching section, etc. (not shown in the drawings), so as to perform post processing desired by the user. The paper sheet, to which no post processing is to be applied, is ejected onto a paper sheet ejecting tray 182 of the post processing apparatus 180, while, the other paper sheet, to which a certain kind of post processing was already applied, is ejected onto a post-processed paper sheet ejecting tray 183 of the same.

Figure 2:
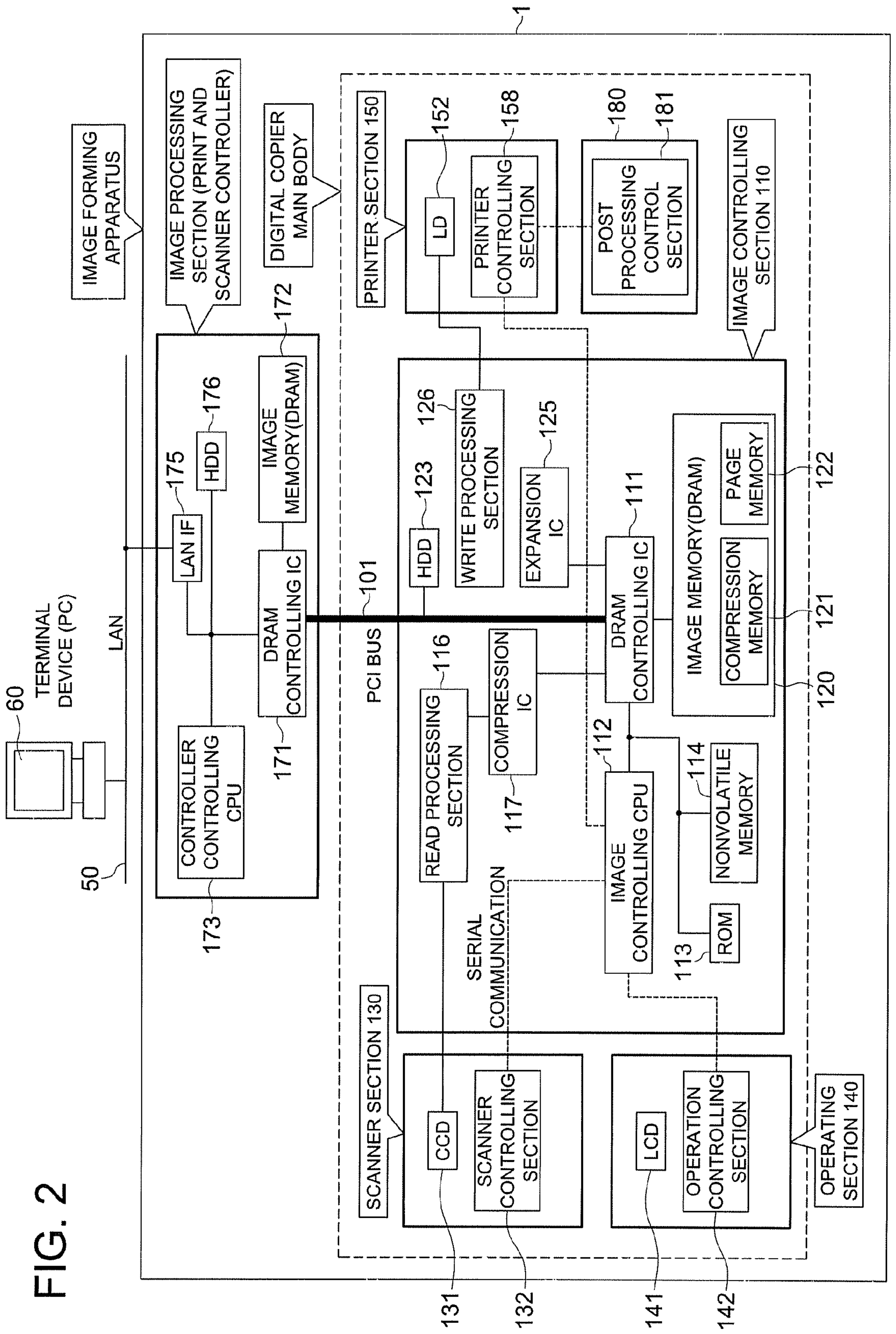
FIG. 2 shows a block diagram indicating an electrical configuration of an image forming apparatus embodied in the present invention.

Next, FIG. 2 shows a block diagram indicating an electrical configuration of the image forming apparatus embodied in the present invention. Referring to FIG. 2, the electrical configuration of the image forming apparatus 1 will be detailed in the following.

The image forming apparatus 1 is constituted mainly by a digital copier main body that is provided with an image controlling section 110, the scanner section 130, the operating section 140 and the printer section 150, and an image processing section (print and scanner controller) that processes the image data to be bilaterally exchanged between the image forming apparatus 1 and an external device (for instance, a terminal device 60, being a personal computer) through a LAN (Local Area Network) 50.

The image controlling section 110 is provided with a PCI (Peripheral Component Interconnect) bus 101, which is coupled to a DRAM (Dynamic Random Access Memory) controlling IC (Integrated Circuit) 111 in the image controlling section 110. Further, the image controlling section 110 is also provided with an image controlling CPU (Central Processing Unit) 112, to which the DRAM controlling IC 111 is coupled. Still further, a ROM (Read Only Memory) 113 in which programs to be executed by the image controlling CPU 112 are stored, and a nonvolatile memory 114 are coupled to the image controlling CPU 112. The nonvolatile memory 114 stores various kinds of data, such as setting data of the image forming apparatus 1, process controlling parameters, image arranging methods for the N-up printing mode, density ranges and threshold values when judging complexity of an image, etc., therein. The image controlling CPU 112 controls whole operations of the image forming apparatus 1, and grasps the current status of the image forming apparatus 1 as a whole. In addition to the above, the image controlling CPU 112 also performs operation controlling activities in the N-up printing mode, the normal printing mode, etc. Namely, the image controlling CPU 112 in conjunction with the ROM 113 and the nonvolatile memory 114 serves as a controlling section of the present invention.

The scanner section 130 is provided with a CCD (Charge Coupled Device) 131 that conducts an optical reading operation and a scanner controlling section 132 that controls operations to be conducted in the scanner section 130 as a whole. The scanner controlling section 132 is coupled to the image controlling CPU 112 so as to make a serial communication between them possible, and is controlled by the image controlling CPU 112. In this connection, the scanner controlling section 132 can be configured by a combination of a CPU, a program to be executed by the CPU, etc. A read processing section 116 applies a certain data processing to the image data read and acquired by the CCD 131. Further, a compression IC (Integrated Circuit) 117 that compresses the image data is coupled to the read processing section 116, and the compression IC 117 is coupled to the DRAM controlling IC 111.

The operating section 140 is provided with a LCD (Liquid Crystal Display) 141 serving as a touch panel display and an operation controlling section 142. The LCD 141 and the operation controlling section 142 are coupled to each other and the operation controlling section 142 is coupled to image controlling CPU 112 so as to make a serial communication between them possible. In the abovementioned configuration, the image controlling CPU 112 performs operations for controlling the operating section 140. In this connection, the operation controlling section 142 can be configured by a combination of a CPU, a program to be executed by the CPU, etc. The operating section 140 makes it possible not only to input various kinds of operation controlling conditions, such as settings for the image forming apparatus 1, operation commands, etc., therefrom, but also to display various kinds of information, such as the contents of the settings, a mechanical status, etc., thereon. Further, the operating section 140 is controlled by the image controlling CPU 112 and transmits the inputted contents to the image controlling CPU 112.

An image memory 120 constituted by a compression memory 121 and a page memory 122 is coupled to the DRAM controlling IC 111, which is further coupled to an HDD (Hard Disc Drive) 123 through the PCI bus 101. The image memory 120 temporarily stores the image data acquired by the scanner section 130 and the other image data acquired through the LAN 50, therein. As mentioned in the above, the image memory 120 serves as storage areas of the image data, so as to store the image data to be employed for the print job, therein. Further, when it is necessary to store the image data in a nonvolatile mode, the DRAM controlling IC 111 stores the image data concerned into the HDD 123.

An expansion IC (Integrated Circuit) 125 that expands the compressed image data is coupled to the DRAM controlling IC 111, and further, a write processing section 126 is coupled to the expansion IC 125. The write processing section 126 is coupled to the LD 152 in the printer section 150 so as to process the data to be employed for modulating the LD 152. Further, the printer section 150 is provided with a printer controlling section 158 that controls the printer section 150 as a whole, while the image controlling CPU 112 is coupled to the printer controlling section 158, so as to control the printer controlling section 158. Concretely speaking, according to the parameters sent from the image controlling CPU 112, the printer controlling section 158 starts or stops the printing operation. Further, the printer controlling section 158 notifies the image controlling CPU 112 of the current status of the printer section 150. Still further, a post processing control section 181, which is provided in the post processing apparatus 180, is coupled to the printer controlling section 158. Accordingly, the operations for controlling the post processing apparatus 180 can be conducted from the image controlling CPU 112 through the printer controlling section 158 and the post processing control section 181. In this connection, each of the printer controlling section 158 and the post processing control section 181 can be configured by a combination of a CPU, a program to be executed by the CPU, etc.

Further, a DRAM (Dynamic Random Access Memory) controlling IC (Integrated Circuit) 171, provided in the image processing section (print and scanner controller), is coupled to the PCI bus 101, which is also coupled to the DRAM controlling IC 111. In the image processing section (print and scanner controller), an image memory 172 and an HDD (Hard Disc Drive) 176 are coupled to the DRAM controlling IC 171. Still further, a controller controlling CPU (Central Processing Unit) 173 is coupled to the DRAM controlling IC 171, and a LAN (Local Area Network) interface 175 is coupled to the DRAM controlling IC 171. Yet further, the LAN interface 175 is coupled to the LAN 50.

Next, fundamental operations to be performed in the image forming apparatus 1 will be detailed in the following. In this connection, the following operations are conducted under the controlling actions of the image controlling CPU 112.

Initially, a procedure for accumulating image data in the image forming apparatus 1 will be detailed in the following.

When the image forming apparatus 1 is operated as a copier or a scanner, the scanner section 130 reads the image of the document so as to generate image data. The image residing on the surface of the document is optically read from the document by employing the CCD 131 in the scanner section 130. At this time, the operation of the CCD 131 is controlled by the scanner controlling section 132 that receives instructions sent from the image controlling CPU 112. The read processing section 116 applies data processing to the image data generated by the CCD 131, and then, the compression IC 117 compresses the processed image data according to the predetermined method. Then, the compressed image data is temporarily stored into the compression memory 121, so that the image controlling CPU 112 controls the compressed image data stored in the compression memory 121 as the job. The image controlling CPU 112 can control a plurality of jobs, and creates a print waiting job queue, when controlling the plurality of jobs. Further, when storing the compressed image data in the nonvolatile mode, the DRAM controlling IC reads out the compressed image data temporarily stored in the compression memory 121, and then, transmits the compressed image data to the HDD 123 trough the PCI bus 101, so as to store the compressed image data into the HDD 123.

When the image data is acquired from a certain external device in order to utilize the image forming apparatus 1 as a printer, such image data that is transmitted from, for instance, the terminal device 60, is stored into the image memory 172 through the LAN interface 175, disposed in the image processing section (print and scanner controller), by the DRAM controlling IC 171. The image data currently stored in the image memory 172 is further transmitted to the page memory 122 through the DRAM controlling IC 171, the PCI bus 101 and the DRAM controlling IC 111, so as to once store the image data into the page memory 122. The image data for plural pages, currently stored in the page memory 122, are sequentially transmitted to the compression IC 117 through the DRAM controlling IC 111, to apply a data compression processing to the image data so as to generate compressed image data. Then, the compressed image data are sequentially stored into the compression memory 121 through the DRAM controlling IC 111, and the image controlling CPU 112 controls the compressed image data as well as the abovementioned. Further, when the image data is stored in the HDD 176 disposed in the image processing section (print and scanner controller), the DRAM controlling IC 171 reads out the image data from the HDD 176, and then, the image data is once stored into the page memory 122 through the PCI bus 101 and the DRAM controlling IC 111. Then, the image data for plural pages are sequentially transmitted to the compression IC 117, to apply a data compression processing to the image data so as to generate compressed image data, which is then stored into the compression memory 121 through the DRAM controlling IC 111.

When the image forming apparatus 1 outputs the image, namely, when the image forming apparatus 1 is utilized as a copier or a printer, the compressed image data stored in the compression memory 121 is transmitted to the expansion IC 125 through the DRAM controlling IC 111, to apply a data expansion processing to the compressed image data so as to generate expanded image data. Then, the expanded image data is transmitted to the write processing section 126 so as to write the image, represented by the expanded image data, onto the circumferential surface of the photoreceptor drum 153 by scanning a laser beam emitted from the LD 152. When reading out the compressed image data stored in the HDD 123, the DRAM controlling IC 111 reads out the compressed image data from the HDD 123 through the PCI bus 101, and once stores the compressed image data into the compression memory 121, so as to implement the procedure same as mentioned in the above.

In this connection, in the N-up printing mode, the compressed image data is read out from the compression memory 121 for every compressed image data for plural pages and transmitted to the expansion IC 125 through the DRAM controlling IC 111 so as to generate expanded image data for the plural pages. Then, the expanded image data for the plural pages is developed on the page memory 122 according to an arranging method established in advance. Successively, the expanded image data for the plural pages, developed on the page memory 122, is compressed by the compression IC 117, and the compressed image data for the plural pages is once stored into the compression memory 121 through the DRAM controlling IC 111. As well as the above, the compressed image data for the plural pages is transmitted to the expansion IC 125 through the DRAM controlling IC 111, to apply a data expansion processing to the compressed image data so as to generate expanded image data. Then, the expanded image data for the plural pages are transmitted to the write processing section 126 so as to write the images, represented by the expanded image data for the plural pages, onto the circumferential surface of the photoreceptor drum 153.

Further, in the printer section 150, under the controlling operations for each of the sections, conducted by the printer controlling section 158 according to the command signals sent from the image controlling CPU 112, the transferring section 155 performs the operation for transferring the toner image, formed on the photoreceptor drum 153, to a predetermined paper sheet (not shown in the drawings), and then, the fixing section 156 fixes the toner image onto the predetermined paper sheet. The predetermined paper sheet onto which toner image is already formed is conveyed into the post processing apparatus 180. When a certain post processing is designated to apply, the post processing concerned is applied to the paper sheet as aforementioned and the processed paper sheet is ejected onto the post-processed paper sheet ejecting tray 183. On the other hand, when no post processing is designated to apply, the predetermined paper sheet is ejected onto the paper sheet ejecting tray 182 without applying any post processing as it is. When a plurality of print waiting jobs exist, the image controlling CPU 112 controls such the plurality of print waiting jobs, so that the image outputting operation for them are sequentially performed one by one in accordance with the registering order of them in a normal situation.

Still further, when outputting the acquired image data to a certain external device, the DRAM controlling IC 111 reads out the compressed image data stored in the compression memory 121, and transmits the compressed image data to the expansion IC 125 so as to expand the compressed image data. Then the DRAM controlling IC 111 stores the expanded image data into the page memory 122. On the other hand, when reading out the compressed image data stored in the HDD 123, the DRAM controlling IC 111 reads out the compressed image data stored in the HDD 123 through the PCI bus 101, and temporarily stores the compressed image data into the compression memory 121, so as to implement the procedure same as mentioned in the above.

Successively, the DRAM controlling IC 111 transmits the image data (expanded image data), stored in the page memory 122, to the DRAM controlling IC 171 in the image processing section (print and scanner controller) through the PCI bus 101. Then, the DRAM controlling IC 171 temporarily stores the image data into the image memory 172. Further, when storing the compressed image data in the nonvolatile mode, the DRAM controlling IC 171 reads out the image data temporarily stored in the image memory 172, and then, transmits the image data to the HDD 176, so as to store the image data into the HDD 176.

When taking the image data stored in the image memory 172 in the image processing section (print and scanner controller) or the HDD 176 outside the image forming apparatus 1, a readout command sent from the terminal device 60 or the like is transmitted to the image processing section (print and scanner controller) through the LAN 50 and the LAN interface 175. Receiving the readout command, the controller controlling CPU 173 makes the DRAM controlling IC 111 read out the image data stored in the image memory 172 or the HDD 176, and then, makes the DRAM controlling IC 111 transmit the image data to the sender of the readout command through the LAN interface 175 and the LAN 50.

As mentioned in the above, the image controlling CPU 112 controls the operation for processing the image data to be employed for the image forming operation (hereinafter, referred to as an image processing). For instance, the image processing for the image data to be employed for forming image on a paper sheet is conducted according to the instruction, sent from the operation controlling section 142, designating either the normal printing mode or the N-up printing mode. When the N-up printing mode is instructed, image data for a plurality of pages are developed on the page memory 122, so that the images, represented by the image data for the plurality of pages, are arranged according to the arrangement method established by receiving the setting input of the arrangement method of the images, represented by the image data for the plurality of pages, from the operation controlling section 142. Further, when conducting the N-up printing mode, the image controlling CPU 112 divides plural pages into groups, so that pages included in each of the groups fulfill the same condition in regard to the image forming operation, and makes it possible for the setting section to establish such an arranging method that the images, represented by the image data of the plural pages included in the same group, are aligned on a same line among plural lines extended along the conveying direction of the paper sheet (hereinafter, referred to as the same line arrangement).

Figure 3:
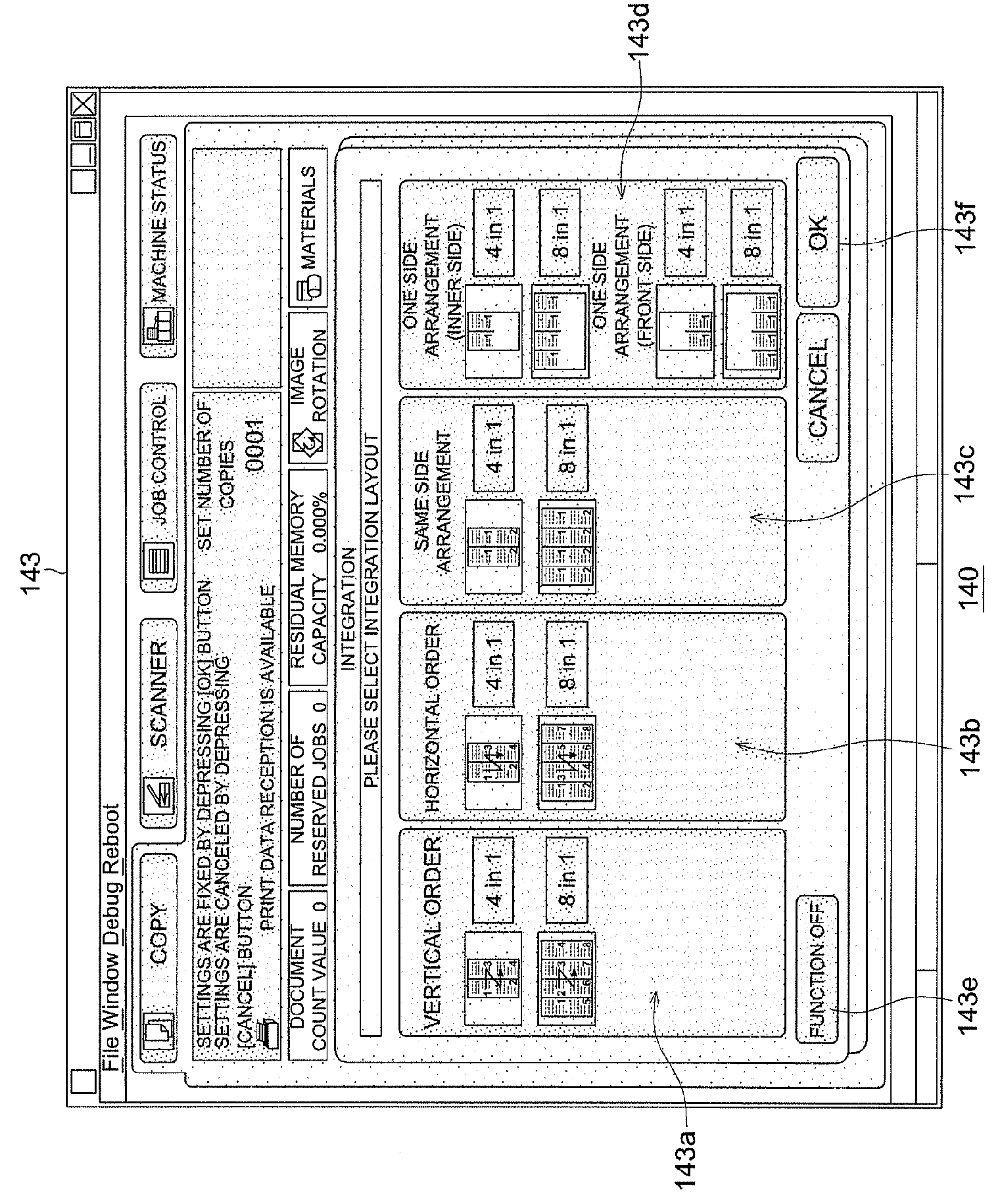
FIG. 3 shows an integrating function setting screen with respect to a N-up printing mode, to be displayed on an operating section of an image forming apparatus embodied in the present invention.

FIG. 3 shows an integrating function setting screen 143 displayed on the operating section 140 under the controlling operation conducted by the image controlling CPU 112. The layout settings in the N-up printing mode can be inputted through the integrating function setting screen 143 by the user.

Arrangement-order designating button groups 143*a* and 143*b* in each of which an arrangement order of pages can be designated by correlating it with a number of the pages to be arranged on a single paper sheet (2-in-1, 4-in-1 or 8-in-1), are displayed within the integrating function setting screen 143.

In the arrangement-order designating button group 143*a*, it is possible to set the method for arranging the images, represented by the image data of the plural pages, in the vertical direction relative to the conveying direction of the paper sheet, while in the arrangement-order designating button group 143*b*, it is possible to set the method for arranging the images, represented by the image data of the plural pages, in the horizontal direction relative to the conveying direction of the paper sheet. The abovementioned vertical order arrangement method and the horizontal order arrangement method are substantially the same as those in the N-up printing mode, the N-in-1 printing mode and the integration printing mode, provided in the conventional image forming apparatus.

Further, the integrating function setting screen 143 is provided with arranging-line setting button groups 143*c* and 143*d*, each of which includes setting buttons for aligning the images, represented by the image data of the plural pages that fulfill the same condition in respect to the image-forming operation and is included in the same group, in the same line. In the arranging-line setting button group 143*c*, the condition of “same pages between plural copies” is established as the same condition in respect to the image-forming operation. Accordingly, it is possible to set the arranging method, so that the concerned page images are aligned in the same line among plural lines in each of which the same pages are grouped in the conveying direction of the paper sheet. In the arranging-line setting button group 143*d*, the condition of “all pages in one job” is established as the same condition in respect to the image-forming operation. Accordingly, it is possible to set the arranging method, so that the all page images are aligned in the same line among plural lines in the conveying direction of the paper sheet.

By depressing a desired one of buttons included in the arrangement-order designating button groups 143*a* and 143*b* displayed in the integrating function setting screen 143, it is possible for the user to select either the vertical order N-up printing mode or the horizontal order N-up printing mode as well as the conventional N-up printing mode. On the other hand, by depressing desired one of buttons included in the arranging-line setting button groups 143*c* and 143*d* displayed in the integrating function setting screen 143, it is possible for the user to select either a same line arrangement in which the same pages are aligned on the same side line or another same line arrangement in which all pages are aligned on one side line. In this connection, when depressing a function OFF button 143*e*, settings for the intensive function are deactivated, so as to return to the normal printing mode. Further, when depressing an OK button 143*f* after depressing any one of the abovementioned selecting buttons, the layout settings, serving as the settings of the arranging method, and the instruction for implementing the N-up printing are transmitted to the image controlling CPU 112, according to the current settings selected by depressing the desired button included in the arrangement-order designating button groups 143*a* and 143*b* or the arranging-line setting button groups 143*c* and 143*d*.

Figure 4:
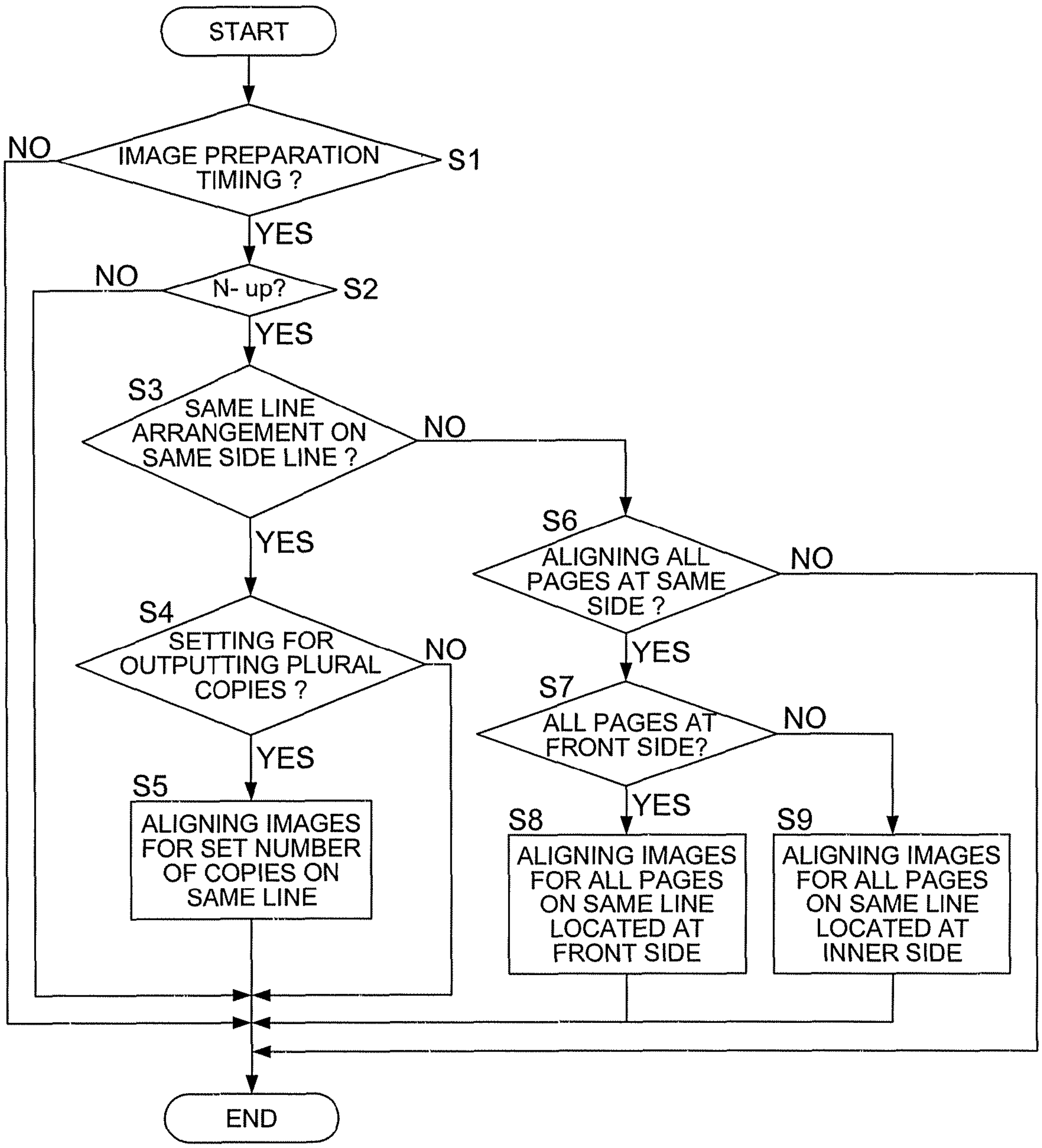
FIG. 4 shows a flowchart indicating procedures for aligning same pages or all pages on a same line in a N-up printing mode.

When conducting the image forming operation, the image controlling CPU 112 conducts the image forming controlling operations for implementing the same line arrangement in N-up printing mode, according to the procedures shown in FIG. 4.

At first, the image controlling CPU 112 determines whether or not it is image preparation timing (Step S1). The image preparation timing is determined by the operator’s action for depressing a start button or the like (not shown in the drawings) after setting the N-up printing mode, etc.

When determining that it is not the image preparation timing (Step S1; NO), the image controlling CPU 112 finalizes the image forming controlling operation for implementing the same line arrangement in the N-up printing mode (END). When determining that it is the image preparation timing, image controlling CPU 112 further determines whether or not the N-up printing mode is instructed (Step S2). As aforementioned, it is possible for the operator to input the instruction of the N-up printing mode as a setting of the job concerned through the operating section 140. Further, other than the above, in the case that the image forming apparatus 1 is utilized as the printer, it is also possible that the instruction of the N-up printing mode is established in the printer driver equipped in the external device (such as the terminal device 60, etc.) at the time when the printing operation is instructed from the external device, and then, its setting contents are transmitted to the image controlling CPU 112 so as to conduct the operations for instructing the N-up printing mode and setting the arrangement method. In this case, the external device serves as the operating section of the present invention. Still further, a controlling section (constituted by a CPU, a program to be executed by the CPU, etc.), provided in the external device, divides plural pages into groups, so that pages included in each of the groups fulfill the same condition in regard to the image forming operation, and makes it possible for the setting section to establish such an arranging method that the images, represented by the image data of the plural pages included in the same group, are aligned on the same line among the plural lines extended along the conveying direction of the paper sheet.

Figure 5:
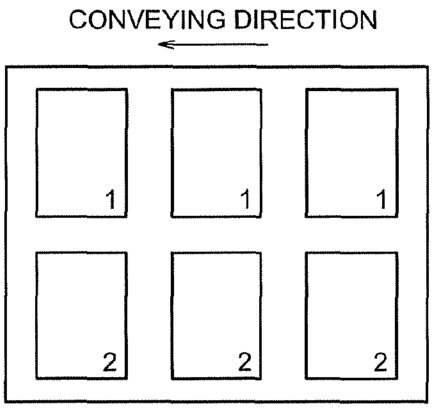
FIG. 5(*a*), FIG. 5(*b*) and FIG. 5(*c*) respectively show schematic diagrams illustrating paper sheets on each of which images are arranged according to corresponding one of various arranging methods.
Figure 5:
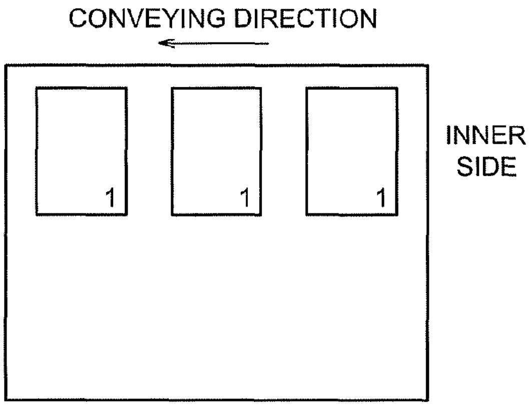
Figure 5:
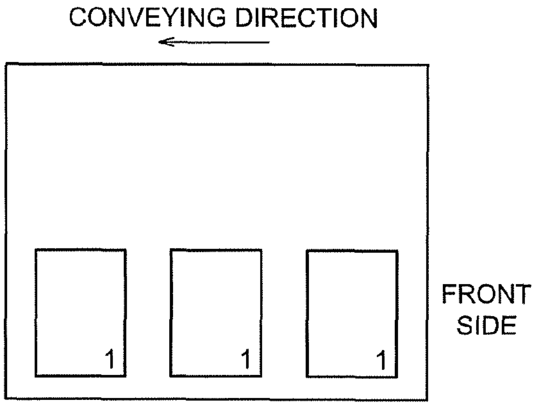

In this connection, such a configuration that the image forming apparatus 1 cooperates with an operating section and/or a controlling section equipped in the abovementioned external device is also included in the scope of the present invention, When determining that the N-up printing mode is not instructed (Step S2; NO), the image controlling CPU 112 finalizes the image forming controlling operation for implementing the same line arrangement in the N-up printing mode (END). On the other hand, when it is recognized that the N-up printing mode is instructed (Step S2; YES), the image controlling CPU 112 determines whether or not the method for arranging the images (represented by the image data) in the N-up printing mode is the same line arrangement in which the same pages are aligned on the same side line (Step S3). When determining that the arranging method is the same line arrangement, namely, when any one of the buttons included in the arranging-line setting button group 143*c* in the integrating function setting screen 143 is selected and set (Step S3; YES), the image controlling CPU 112 determines whether or not a setting for outputting plural copies is established in the concerned print job (Step S4). When determining that the setting for outputting plural copies is not established in the concerned print job (Step S4; NO), since it is impossible to implement the abovementioned same line arrangement, the image controlling CPU 112 finalizes the image forming controlling operation for implementing the same line arrangement in the N-up printing mode (END). When determining that the setting for outputting plural copies is established in the concerned print job (Step S4; YES), the image controlling CPU 112 applies an image processing to the image data, so that the images, represented by the image data for a set number of copies, are aligned on the same line extended along the conveying direction of the paper sheet (in this embodiment, the images are aligned on the same line located at any one of a front side and an inner side in the main-scanning direction) (Step S5). The image forming operations are conducted on the basis of the image data to which the abovementioned alignment processing is applied. FIG. 5(*a*) shows a schematic diagram illustrating the images arranged on the paper sheet according to the abovementioned method.

On the other hand, when determining that the arranging method is not the abovementioned same line arrangement (Step S3; NO) though it is recognized that the N-up printing mode is instructed (Step S2; YES), the image controlling CPU 112 determines whether or not a setting for aligning all pages at the same side is established in the concerned print job (Step S6). When determining that the setting for aligning all pages at the same side is not established (Step S6; NO), the image controlling CPU 112 finalizes the image forming controlling operation for implementing the same line arrangement in the N-up printing mode (END). When determining that the setting for aligning all pages at the same side is established, namely, when any one of the buttons included in the arranging-line setting button group 143*d* is selected and set (Step S6; YES), the image controlling CPU 112 determines whether or not a setting for aligning all pages at the front side is established in the concerned print job (Step S7). When determining that the setting for aligning all pages at the front side is established (Step S7; YES), the image controlling CPU 112 applies an image processing to the image data, so that all of the images, represented by the image data for all pages, are aligned on the same line located at a front side and extended along the conveying direction of the paper sheet (Step S8). On the other hand, when determining that the setting for aligning all pages at the front side is not established (Step S7; NO), the image controlling CPU 112 applies another image processing to the image data, so that all of the images, represented by the image data for all pages, are aligned on the same line located at an inner side and extended along the conveying direction of the paper sheet (Step S9). The image forming operations are conducted on the basis of the image data to which the abovementioned alignment processing is applied. FIG. 5(*b*) and FIG. 5(*c*) show schematic diagrams, each illustrating the images arranged on the paper sheet according to any one of the abovementioned methods.

Figure 6:
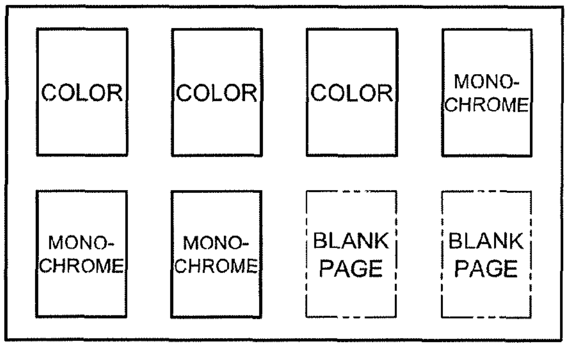
FIG. 6 shows a schematic diagram illustrating a single paper sheet, on which color images and monochrome images are arranged.

In the present embodiment mentioned in the above, when the pages, represented by the image data, are aligned on the same line, the setting of either "same pages" or "all pages" is established as the same condition in respect to the image forming operation. According to the present invention, in addition to the above, it is also possible to divide the pages into a color image group and a monochrome image group, the difference between which considerably influences the output image quality, and then, to align pages, included in the color image group and represented by the color image data, on the same line as the same group. In the same line arrangement of the color images, it is possible to establish a specific line on which the color images represented by the color image data should be aligned, in the similar manner as aforementioned. For instance, when two lines are created as the N-up printing mode, it is possible to established any one of the two lines, located at the front side and the inner side, as the line on which the color pages, represented by the color image data, are to be aligned. Other than the above, when the monochrome pages, are mingled with the color pages, since the monochrome pages are little influenced by the density inclination, it is possible to arrange the monochrome pages onto a residual blank area other than the area onto which the color pages are aligned. FIG. 6 shows a schematic diagram, illustrating the color pages and the monochrome pages arranged on the single paper sheet according to the abovementioned methods. As shown in FIG. 6, the color pages, represented by the color image data, are aligned only on the same line.

In this connection, it may be possible to determine whether image data is either color image data or monochrome image data, by referring to the page information (color/monochrome information) included in the concerned image data, which is transmitted from the external device or the like, or by referring to the printing rate at the time when image data for each color is inputted. Further, the printing rate is defined as an area ratio of a printed dot area versus a whole page area.

Further, when the pages, represented by the image data, are aligned on the same line, it is possible to determine a certain condition, which is established by referring to a parameter representing a complexity of the image in each of the pages within the same print job, as the same condition in respect to the image forming operation. A number of pixels within a predetermined density range of the image; a compression ratio of the image data and a printing ratio of the image data can be cited (exemplified) as the above parameter. For instance, the number of pixels of the image can be derived by counting a number of pixels within a predetermined range of a density area in the image data for each color. With respect to the counting operation abovementioned, the image controlling CPU 112 creates a density distribution for each of the image data, and counts a number of pixels that indicate high densities in a range of predetermined value. Then, corresponding to the result of whether or not the above counted value exceeds a certain threshold value, the image controlling CPU 112 can determine whether or not the concerned image is a complex image.

Still further, the compression ratio of the image data can be derived from the file capacity measured after the image compression processing is completed by employing the non-fixed compression method in the compression IC. The image controlling CPU 112 can find both the compression ratio and the printing ratio abovementioned.

In this connection, the predetermined density range and the threshold value, mentioned in the above, are stored into the nonvolatile memory 114, so that the image controlling CPU 112 can read out them as needed. Accordingly, the nonvolatile memory 114 serves as a storage section defined in the claimed present invention.

Figure 7:
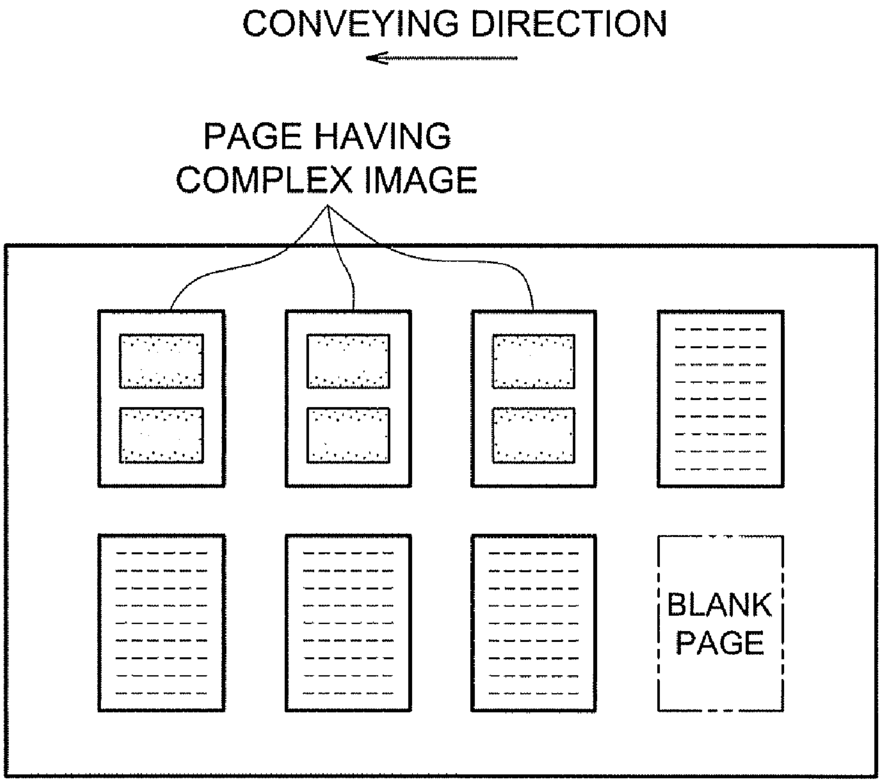
FIG. 7 shows a schematic diagram illustrating a single paper sheet, on which complex images and other images are aligned.

The image data, determined as image data representing the page having the complex image, is categorized into the same group, so as to discriminate it from other pages. When the same line arrangement is established in the N-up printing mode and the pages are divided into groups according to the result of determining whether or not the page has the complex image, the image controlling CPU 112 establishes the aligning line of the images categorized in the group concerned, so as to align the images, categorized in the same group concerned, on the same line according to the same line arrangement established in the above. Further, since image quality of other images, represented by image data categorized in a group other than the abovementioned group, are little influenced by the density inclination, it is possible to arrange the other pages onto a residual blank area other than the area onto which the pages having complex images are aligned. FIG. 7 shows a schematic diagram illustrating the images, arranged on the single paper sheet according to the abovementioned methods. As shown in FIG. 7, the pages having complex images are aligned only on the same line (located at the inner side in the drawing).

Further, when the plural pages, represented by the image data having the same condition in respect to the image forming operation, are aligned on the same line, sometimes, a blank page area could be generated. Specifically, when all of the pages are aligned on a single line, all of other lines are categorized in the blank page area. Accordingly, in order not to waste the blank area of the paper sheet, it is possible to arrange images, represented by image data of another print job, onto the blank page area concerned.

Figure 8:
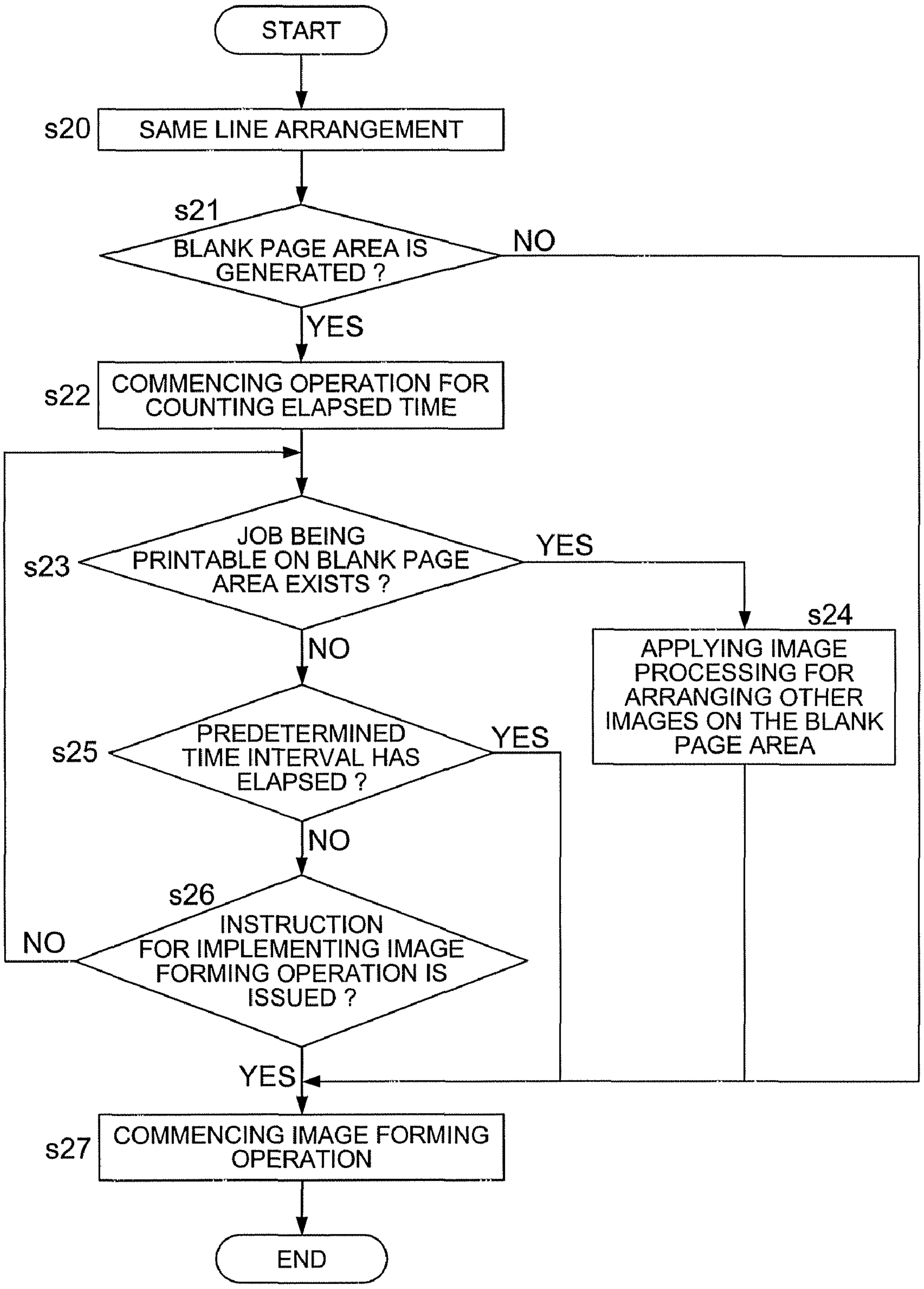
FIG. 8 shows a flowchart indicating a procedure for arranging other images included in another job onto a blank page area.

FIG. 8 shows a flowchart indicating a procedure for conducting the abovementioned feature. Referring to the flowchart shown in FIG. 8, the procedure will be detailed in the following.

Figure 9:
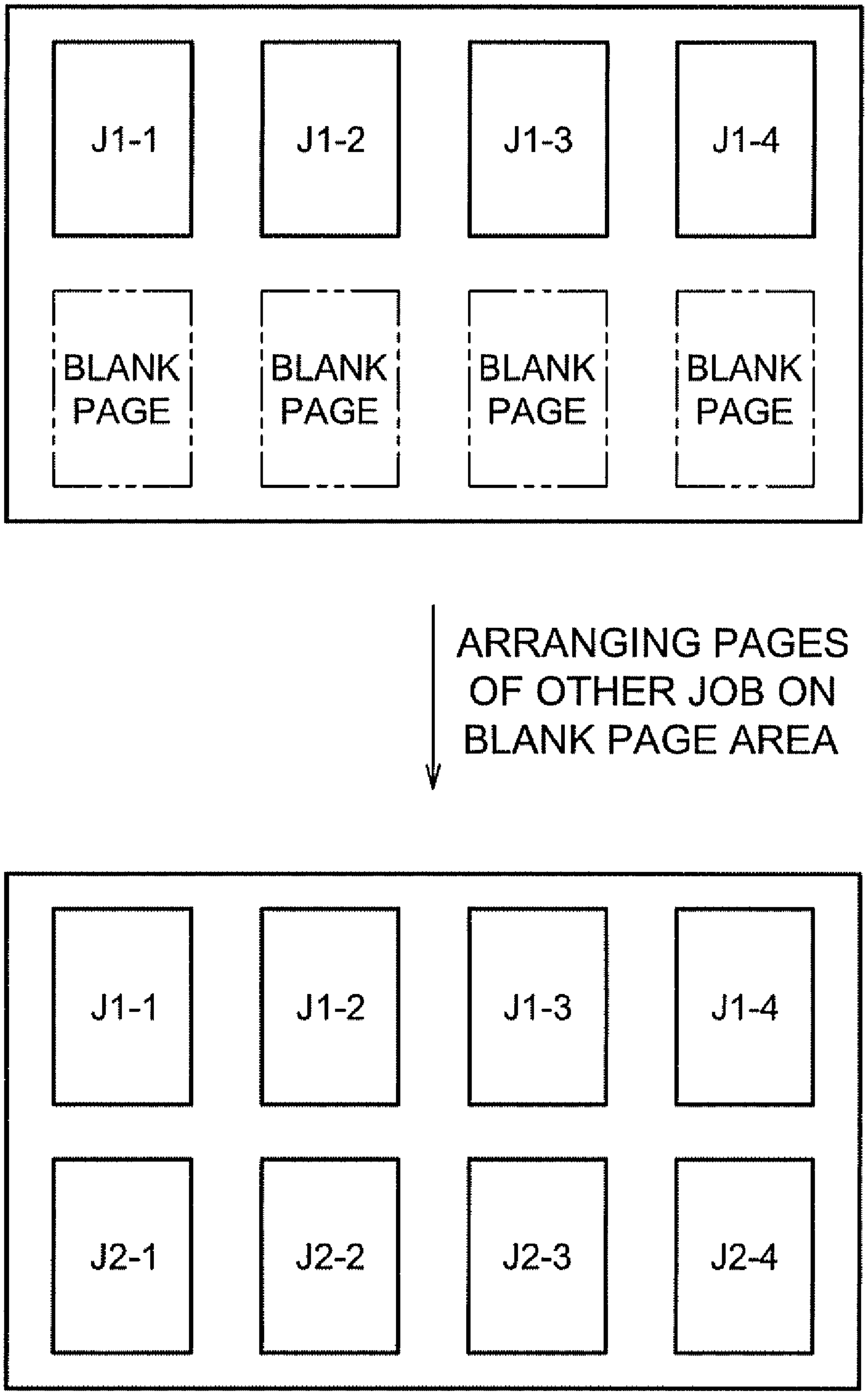
FIG. 9 shows a schematic diagram illustrating a single paper sheet, on which images of a job are aligned and on a blank page area of which other images included in another job are aligned.
Figure 10:
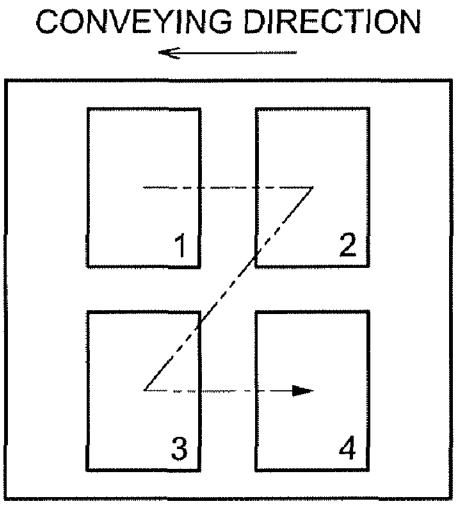
FIG. 10(*a*), FIG. 10(*b*), FIG. 10(*c*) and FIG. 10(*d*) show paper sheets on each of which images are arranged according to a corresponding one of various kinds of image arranging methods in a conventional N-up printing mode.
Figure 10:
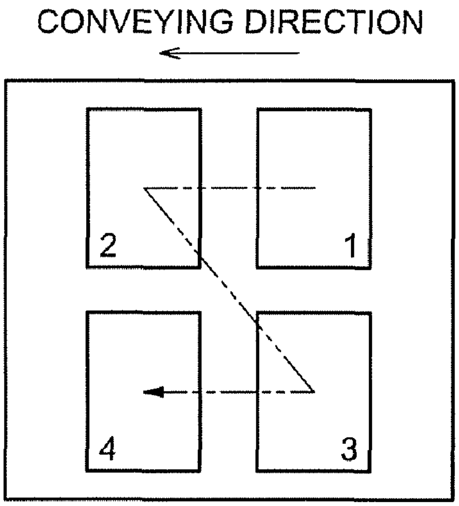
Figure 10:
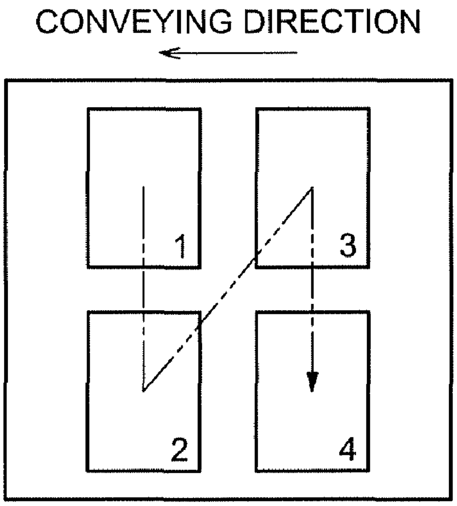
Figure 10:
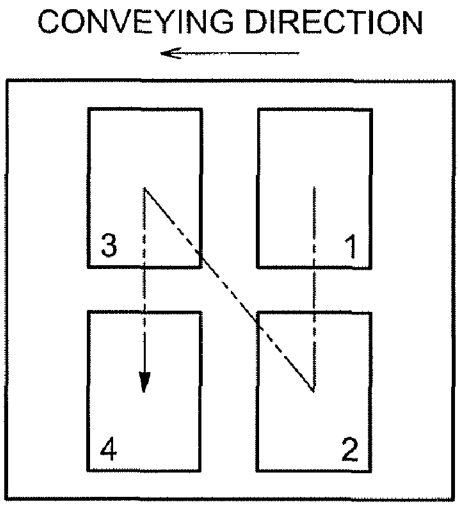

Initially, as aforementioned, the image controlling CPU 112 applies the image processing, for aligning the images represented by the image data of the plural pages, having the same condition in respect to the image forming operation, on the same line, to the image data concerned, and then, temporarily stops the image forming operation (Step S20). Based on the result of the image processing, the image controlling CPU 112 determines whether or not the blank page area is generated when the abovementioned images are formed on a single paper sheet (Step S21). When determining that the blank page area is not generated (Step S21; NO), the image controlling CPU 112 implements the image forming operation based on the image data processed in Step S20 (Step S27). When determining that the blank page area is generated (Step S21; YES), the image controlling CPU 112 commences the operation for counting elapsed time (Step S22), and determines whether or not a job, being printable on the blank page area, exists in the print waiting job queue controlled by itself (Step S23). For instance, the fact that the N-up printing mode is designated, the other fact that a number of pages to be arranged on a single paper sheet is the same as that of the job being aligned on the same line, etc., can be cited as the grounds for determining whether or not the job concerned is printable on the blank page area. When determining that the other job, being printable on the blank page area, exists (Step S23; YES), the image controlling CPU 112 applies the image processing, for arranging other images represented by image data of the other job on the blank page area, to the image data concerned (Step S24). Then, the image controlling CPU 112 implements the image forming operation based on the image data processed in Step S24 (Step S27). FIG. 9 shows a schematic diagram illustrating an exemplified layout arranged according to the abovementioned procedure. As shown in FIG. 9, after the operation for aligning the pages (J1-1, - - - ), included in a certain job, onto the same line is completed, the other pages (J2-1, - - - ) included in another job are arranged into the blank page area, so as to effectively use the blank page area to be generated on the paper sheet. Further, by arranging the other pages, included in the other job, onto the blank page area of the paper sheet on which the pages, included in the certain job, are already aligned, as abovementioned, the other pages included in the other job concerned can be aligned on the same line. Accordingly, when the same line aligning operation is also necessary for aligning the other pages included in the other job concerned, it is possible to suppress the generation of the blank page area by applying this arranging method.

On the other hand, when determining that the other job, being printable on the blank page area, does not exist (Step S23; NO), the image controlling CPU 112 determines whether or not the predetermined time has elapsed since the commencement of the time counting (Step S25). When determining that the predetermined time has not elapsed (Step S25; NO), the image controlling CPU 112 further determines whether or not an operational instruction for implementing the image forming operation without waiting another job is issued (Step S26). This kind of operational instruction is actually issued, for instance, when the operator operates the operating section 140 so as to implement the image forming operation. When determining that no operational instruction is issued (Step S26; NO), returning to Step S23, the image controlling CPU 112 repeats to determine whether or not a job, being printable on the blank page area, exists in the print waiting job queue (Step S23). If a new job being printable on the blank page area is newly registered into the print waiting job queue within the predetermined time interval, it is possible to implement the new job newly registered, by arranging the pages included in the new job onto the blank page area (Step S27). When determining that the predetermined time has elapsed (Step S25; YES), the image controlling CPU 112 implements the image forming operation based on the image data representing the pages aligning on the same line (Step S27).

Although the preferred embodiment of the present invention has been described in the foregoing, the scope of the present invention is not limited to the aforementioned embodiment of the present invention. Further, modifications and additions made by a skilled person without departing from the spirit and scope of the invention shall be included in the scope of the present invention.

According to the present invention, since the images included in the same group are aligned on the same line, it becomes possible to avoid the influence of the density inclination in the main-scanning direction, caused by the various factors in the image forming section, and therefore, it becomes possible to keep an image density of each of the images constant, even if the images are disposed on the lines being different from each other when the concerned paper sheet is cut into the plural pages.

While the preferred embodiments of the present invention have been described using specific term, such description is for illustrative purpose only, and it is to be understood that changes and variations may be made without departing from the spirit and scope of the appended claims.

What is claimed is:

1. An image forming apparatus that performs an image forming operation based on a job, and that is provided with a N-up printing mode in which plural images, represented by image data of plural pages, are arranged onto a single paper sheet, comprising:

an image forming section that forms an image on a paper sheet, based on image data;

an operating section to designate the N-up printing mode, and to set an arranging method, to be employed in the N-up printing mode, for arranging the plural images, represented by the image data of the plural pages, onto the single paper sheet; and a controlling section to apply image processing to the image data of the plural pages, so that the plural images, represented by the image data of the plural pages, are arranged onto the single paper sheet according to the arranging method set by the operating section, when the N-up printing mode is designated from the operating section;

wherein, when implementing the image forming operation in the N-up printing mode, the controlling section groups the plural pages into a single group or plural groups, each of which includes specific pages fulfilling a same condition in respect to the image forming operation, and then, aligns the specific pages, included in the single group or one of the plural groups, on a same line among plural lines extended along a conveying direction of the single paper sheet.

2. The image forming apparatus of claim 1, wherein the same condition is established as such a condition that the specific pages are a same page of plural copies to be formed in a same job.

3. The image forming apparatus of claim 1, wherein the same condition is established as such a condition that the specific pages are all pages to be formed in a single job.

4. The image forming apparatus of claim 1, wherein the same condition is established as such a condition that the specific pages are color pages, represented by color image data, to be formed in a single job.

5. The image forming apparatus of claim 4, wherein monochrome pages, represented by monochrome image data, and the color pages, represented by the color image data, are mingled with each other in the single job.

6. The image forming apparatus of claim 5, wherein the controlling section applies the image processing to the color image data of the color pages, so that the color pages are aligned on the same line, and when a blank page area, in which the color pages are not arranged, is generated as a result of aligning the color pages within the single paper sheet, the controlling section applies the image processing to the monochrome image data of the monochrome pages, so that the monochrome pages are arranged on the blank page area.

7. The image forming apparatus of claim 1, wherein the same condition is established as such a condition that the specific pages are selected by referring to a parameter representing complexity of an image included in each of the plural pages to be formed in a same job.

8. The image forming apparatus of claim 7, wherein the parameter representing complexity is a number of pixels within a predetermined density range.

9. The image forming apparatus of claim 7, wherein the parameter representing complexity is either a printing rate or a compression rate of the image data.

10. The image forming apparatus of claim 7, further comprising:

a storage section to store a threshold value for determining the same condition by referring to the parameter.

11. The image forming apparatus of claim 1, wherein the controlling section applies the image processing to the image data, so that the plural pages, represented by the image data and to be formed in a same job, are aligned on the same line, and when a blank page area, in which the plural pages are not arranged, is generated as a result of aligning the plural pages within the single paper sheet, the controlling section refers to a print waiting job queue so as to determine whether or not another job, which includes other pages being printable into the blank page area, exists in the print waiting job queue; and wherein when determining that the other job exists in the print waiting job queue, the controlling section applies the image processing to image data of the other pages included in the other job, so that the other pages are arranged on the blank page area.

12. The image forming apparatus of claim 1, wherein the controlling section applies the image processing to the image data, so that the plural pages, represented by the image data and to be formed in a same job, are aligned on the same line, and when a blank page area, in which the plural pages are not arranged, is generated as a result of aligning the plural pages within the single paper sheet, the controlling section refers to a print waiting job queue so as to determine whether or not another job, which includes other pages being printable into the blank page area, exists in the print waiting job queue; and wherein when determining that the other job does not exist in the print waiting job queue, the controlling section halts the image forming operation to be applied to the single paper sheet including the blank page area, until a predetermined time interval has elapsed or an operation for releasing a halt status of the image forming operation is conducted.

* * * * *